United States Patent
Pate et al.

(10) Patent No.: US 6,537,402 B2
(45) Date of Patent: Mar. 25, 2003

(54) MEMBRANE WELDING APPARATUS INCLUDING A VISUAL SEAM MARKER

(75) Inventors: Harold T. Pate, Perrysburg, OH (US); Dave Scott, Grove City, OH (US)

(73) Assignee: Omnova Solutions Inc., Fairlawn, OH (US)

( * ) Notice: Subject to any disclaimer, the term of this patent is extended or adjusted under 35 U.S.C. 154(b) by 11 days.

(21) Appl. No.: 09/916,155

(22) Filed: Jul. 26, 2001

(65) Prior Publication Data

US 2003/0019566 A1 Jan. 30, 2003

(51) Int. Cl.[7] .............................................. B32B 31/00
(52) U.S. Cl. ........................... 156/71; 156/82; 156/497; 156/499; 156/544; 156/574
(58) Field of Search ........................... 156/71, 82, 497, 156/499, 544, 574

(56) References Cited

U.S. PATENT DOCUMENTS

| | | |
|---|---|---|
| 3,296,856 A | 1/1967 | Elias |
| 3,409,198 A | 11/1968 | Peterman |
| 3,444,732 A | 5/1969 | Robbins et al. |
| 3,533,548 A | 10/1970 | Taterka |
| 3,558,886 A | 1/1971 | Carver |
| 3,740,290 A | 6/1973 | Kelsey et al. |
| 3,770,547 A | 11/1973 | Kelsey |
| 4,391,662 A | 7/1983 | Mauthe |
| 4,684,417 A | 8/1987 | Grandclement |
| 4,725,328 A | 2/1988 | Arnold |
| 4,834,828 A * | 5/1989 | Murphy ...................... 156/359 |
| 5,143,568 A | 9/1992 | Sheahan |
| 5,526,624 A | 6/1996 | Berg |
| 5,593,748 A | 1/1997 | Hubbard |
| 5,616,199 A | 4/1997 | Jurrius et al. |
| 5,772,816 A | 6/1998 | Hubbard |
| 5,935,357 A | 8/1999 | Hubbard et al. |
| 6,004,645 A | 12/1999 | Hubbard |
| 6,055,786 A | 5/2000 | Hubbard et al. |
| 6,187,122 B1 | 2/2001 | Hubbard et al. |
| 6,238,502 B1 | 5/2001 | Hubbard |
| 6,253,528 B1 | 7/2001 | Hubbard et al. |

* cited by examiner

Primary Examiner—James Sells
(74) Attorney, Agent, or Firm—Larry R. Meenan; Robert F. Rywalski

(57) ABSTRACT

A roof membrane welding apparatus capable of applying a weld to a first membrane and an overlapping second membrane. The apparatus includes a movably supported chassis, a welder attached to the chassis for heating the top membrane to at least the vicant softening point to weld the overlapping second membrane and the first membrane, and at least one weld wheel rotatably attached to the chassis and located rearward of the nozzle relative to the direction of movement of the apparatus, the weld wheel including a marker having an indicia thereon that is transferred to a top surface of the second membrane only where the first membrane and the second membrane have undergone a phase change during heating.

19 Claims, 4 Drawing Sheets

MEMBRANE WELDING APPARATUS INCLUDING A VISUAL SEAM MARKER

BACKGROUND OF THE INVENTION

1. Field of the Invention

The invention generally relates to a membrane welding apparatus including a visual seam marker. More particularly, the invention relates to a membrane welding apparatus including a visual seam marker for applying an indicia on the upper surface of overlapping thermoplastic and composite type thermoset membranes when the overlapping membranes have been subjected to a sufficiently high temperature to achieve a proper seal between them.

2. Description of the Related Art

Within the last decade, thermoplastic roofing membranes have become significant products in the commercial and industrial marketplace. They provide good service life on flat and low slope roofs while representing a cost effective alternative to built up roofs and other previously available roofing systems. Roofing membrane products are typically manufactured as elongate sheet goods having a width of 3 feet (0.9 meters) or greater which are provided in rolls. The membrane is unrolled on a roof with edge adjacent portions of the membranes overlapped on the roof surface. The overlapped regions are then sealed together.

In order to achieve their service and cost saving potential, these roofing membranes must be continuously and tightly sealed along these overlapping regions. Typically, the overlapping regions are sealed by heating the adjacent surfaces of the overlapping membranes and then pressing the heated surfaces together, merging the material of the membranes and providing a strong seal. The integrity of the seal and thus of the overall roof depends upon appropriate and sufficient heat application to achieve melting of the membrane material and a positive, continuous seal between the overlapping membranes.

A roof membrane welding apparatus for forming a weld is described in U.S. Pat. No. 4,834,828, incorporated herein by reference. The roof membrane welding apparatus includes a nozzle having an outlet of a fixed width for applying heat and producing a weld to the membranes and a single weld wheel located in front of the nozzle to press the two membranes together after the welds have been produced.

The industry has maintained that the roofing contractor has to control and verify the quality of his welding skill by destructive seam analysis and seam probing. The present invention will reduce and or eliminate the time consuming "seam probing" once destructive seam analysis criteria have been fulfilled.

In all hot air welding operations of any and all heat welded materials, the operator must select the proper speed, temperature and pressure to effect a weld between the various gauges and colors of membrane types. He must be knowledgeable of the factors that will vary the ultimate strength of his constructed bond. The conditions (weather, housekeeping practices) of the job site will also effect the resultant strength of the final weld.

Destructive Seam Analysis tests require the following, at the beginning of each day's seam welding, the operator responsible for seam integrity must perform the following destructive seam analysis by cutting out a 2.5 cm by 15.2 cm (1 inch×6 inch) cross section of the seam and perform a peel of the seam sample. This should result in the destruction of either the bottom surface of the top membrane or the top surface of the bottom membrane (ability to see the fabric reinforcement of the membrane). There should be separation of the weld down to the scrim or fabric reinforcement or membrane(s) destruction outside the welded area.

This type of testing should be performed every time there is an interruption in the welding process (i.e. power failure, welder shut down, job site condition changes, etc.)

To limit the possibility of blisters in the seam area, never unwrap the roofing membrane rolls until they are to be installed and have the proper time to relax or come to equilibrium with atmospheric or climatic conditions.

The operator must establish hot air welding conditions for all seams constructed daily. Do not expose edges of the unwelded seams to prolonged moisture.

The second, more time consuming seam verification process is SEAM Probing. Probing is a physical inspection of the hot air welded area by using a suitable blunt object (cotter-key puller with the point filed down or #2 Phillips screwdriver with its point filed down) along the length of the weld. Pressure is applied to the raised edge of the weld. A poorly constructed weld will open.

All hot air welded seams must be physically probed and this operation is time consuming but mandatory by all thermoplastics or heated welded membranes system.

One approach to ensuring a membrane-to-membrane seal is the intentional excess application of heat. While this may achieve a seal, it is generally slow as the application of larger quantities, i.e., excess, heat takes longer than the application of the appropriate amount of heat. More importantly, however, excess heat application may result in damage to the roofing membranes which will ultimately shorten their service life. Furthermore, such an approach is energy inefficient. Another approach to ensuring seal integrity involves checking, either visually or mechanically and either on a spot or continuous basis, the seal by manually lifting the edge of the upper membrane to determine if it is properly secured to the lower membrane. Obviously, spot checks can miss unexamined unsealed areas and continuous inspection of every seam is time consuming and therefore costly.

The present invention is directed to a method and apparatus for visually verifying the integrity of a weld of overlapping membranes by the proper set-up of the controlling elements (time, temperature and pressure) of a welding apparatus. The present invention utilizes an indicia caused by the weld wheel to indicate that a bond has been achieved between the mating layers of membrane material.

SUMMARY OF THE INVENTION

Briefly, according to this invention, there is provided a roof membrane welding apparatus capable of applying a weld to a first membrane and an overlapping second membrane. The apparatus includes a movably supported chassis, a welder attached to the chassis for heating both membranes to at least the vicant softening point to permit welding of the overlapping second membrane to the first membrane, and at least one weld wheel rotatably attached to the chassis and located rearward of the nozzle relative to the direction of movement of the apparatus. The weld wheel assembly includes a marker having an indicia thereon that is transferred to a top surface of the second membrane only where the first membrane and the second membrane have undergone a phase change during heating.

The integrity of the weld formed between overlapping membranes is verified by pressing a marker including an indicia against the top membrane along the area of overlap such that the indicia is transferred to a top surface of the membrane only where the membranes both undergo a phase change during heating.

BRIEF DESCRIPTION OF THE DRAWINGS

Further features of the present invention, as well as the advantages derived therefrom, will become clear from the following detailed description made with reference to the drawings in which.

DESCRIPTION OF THE PREFERRED EMBODIMENT

Figure 1:
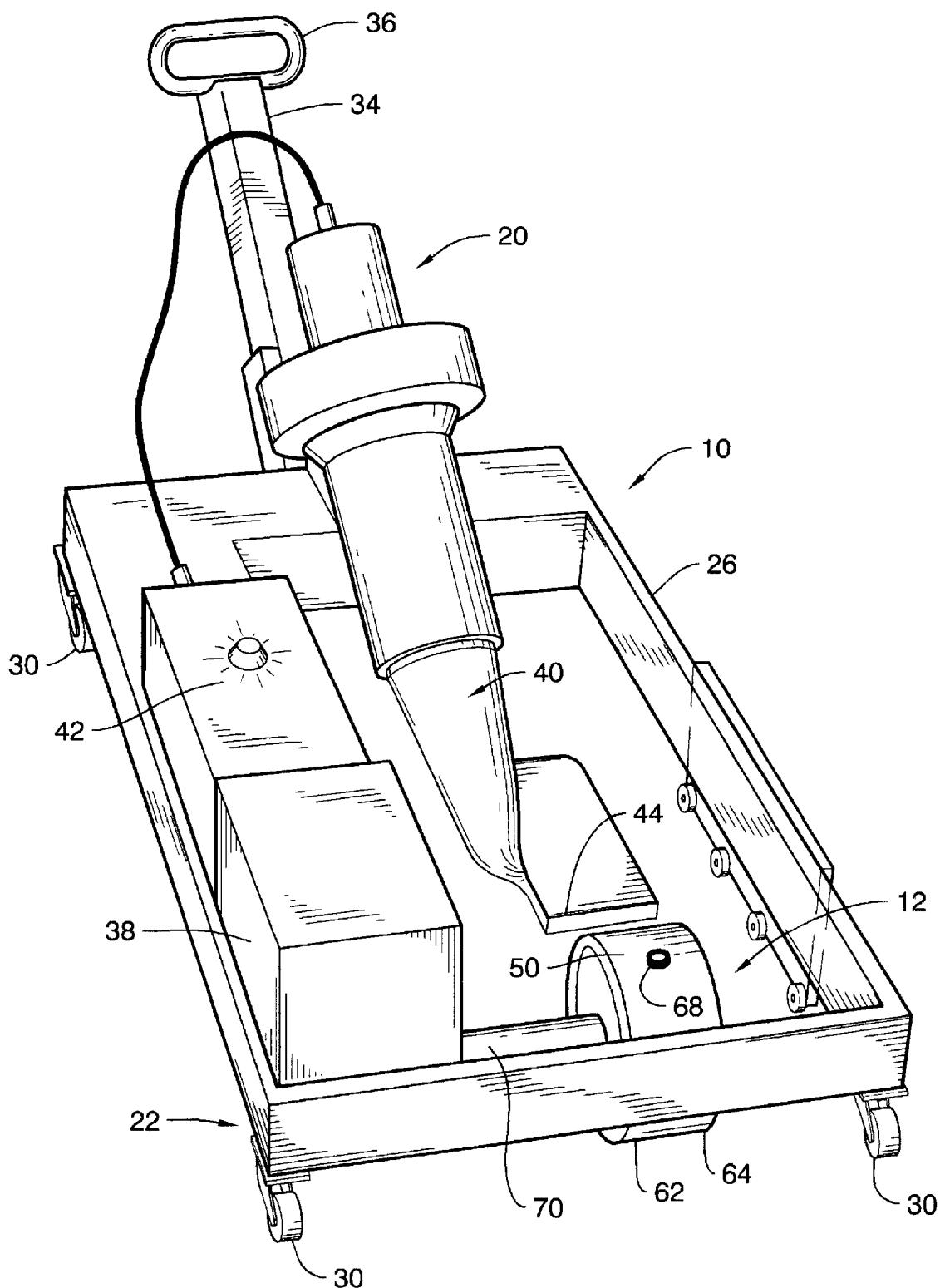
FIG. 1 is a perspective view of hot air welder including a visual seam indicator.

Referring to the drawings, wherein like reference characters represent like elements, there is shown a roof membrane welding apparatus 10 including a visual seam marker 12 for visually verifying the integrity of a heat weld of overlapping roof membranes 14A and 14B.

Figure 2:
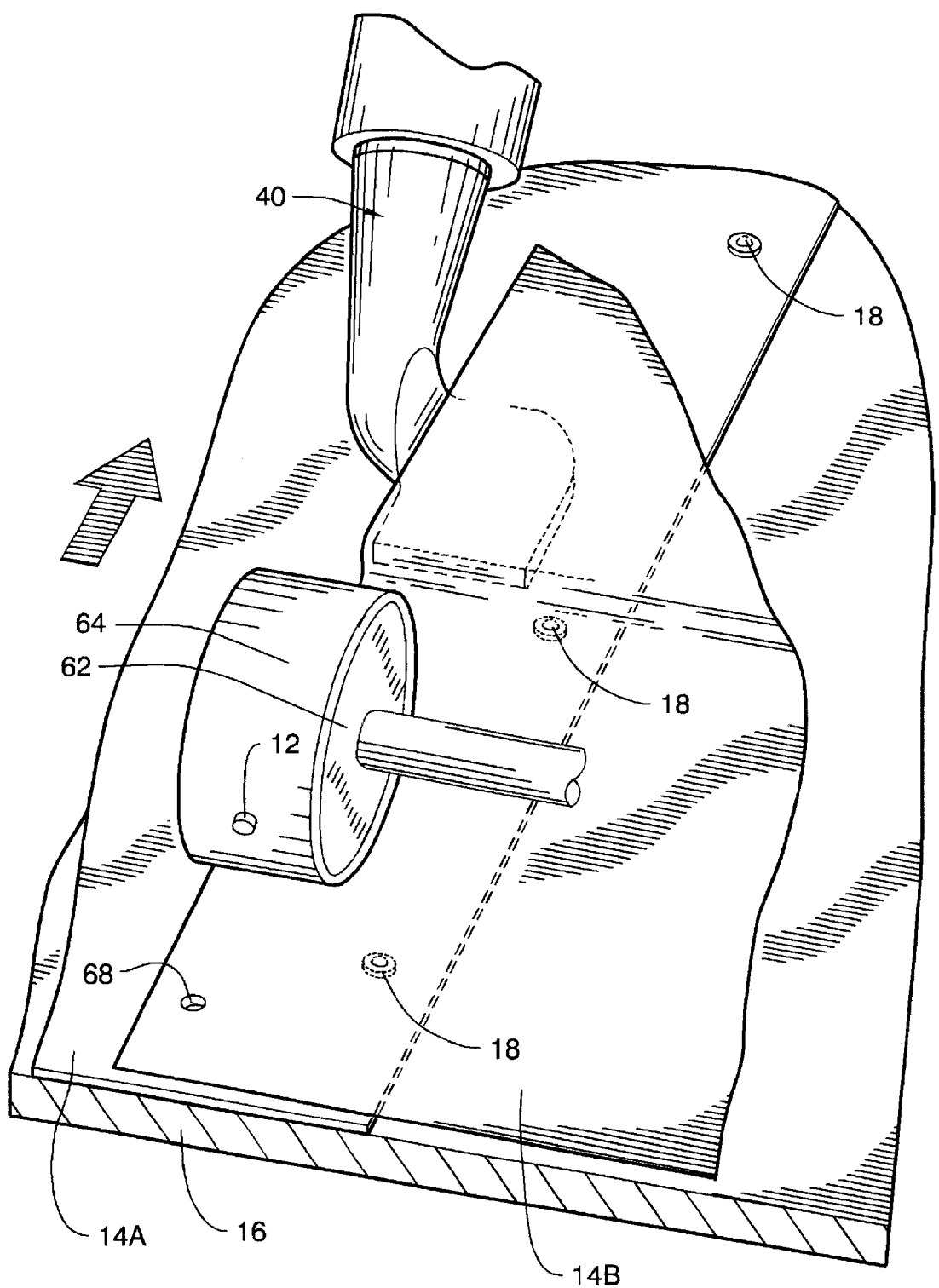
FIG. 2 is an enlarged partial perspective view of a nozzle of a hot air welder and visual seam indicator forming an image of the indicia in the overlapping membranes.
Figure 3:
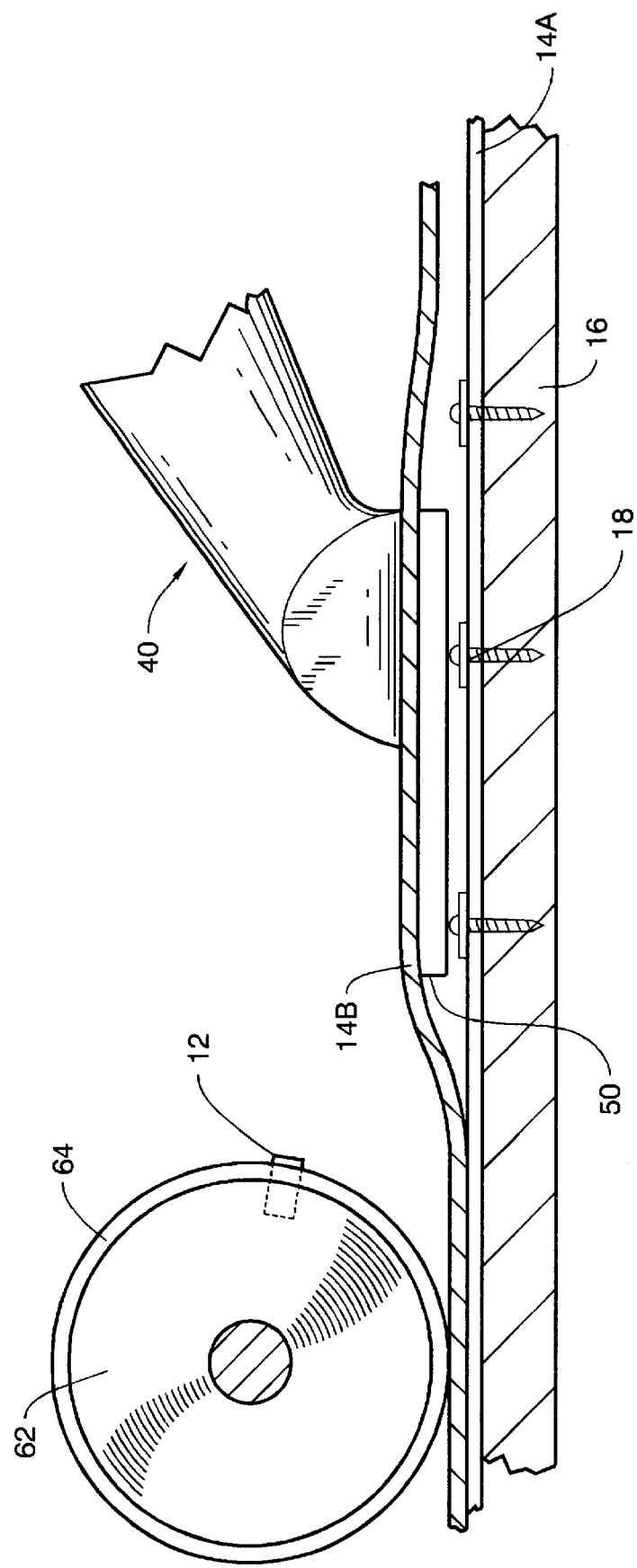
FIG. 3 is an enlarged partial side view of nozzle, visual seam indicator and overlapping membranes of FIG. 2.
Figure 4:
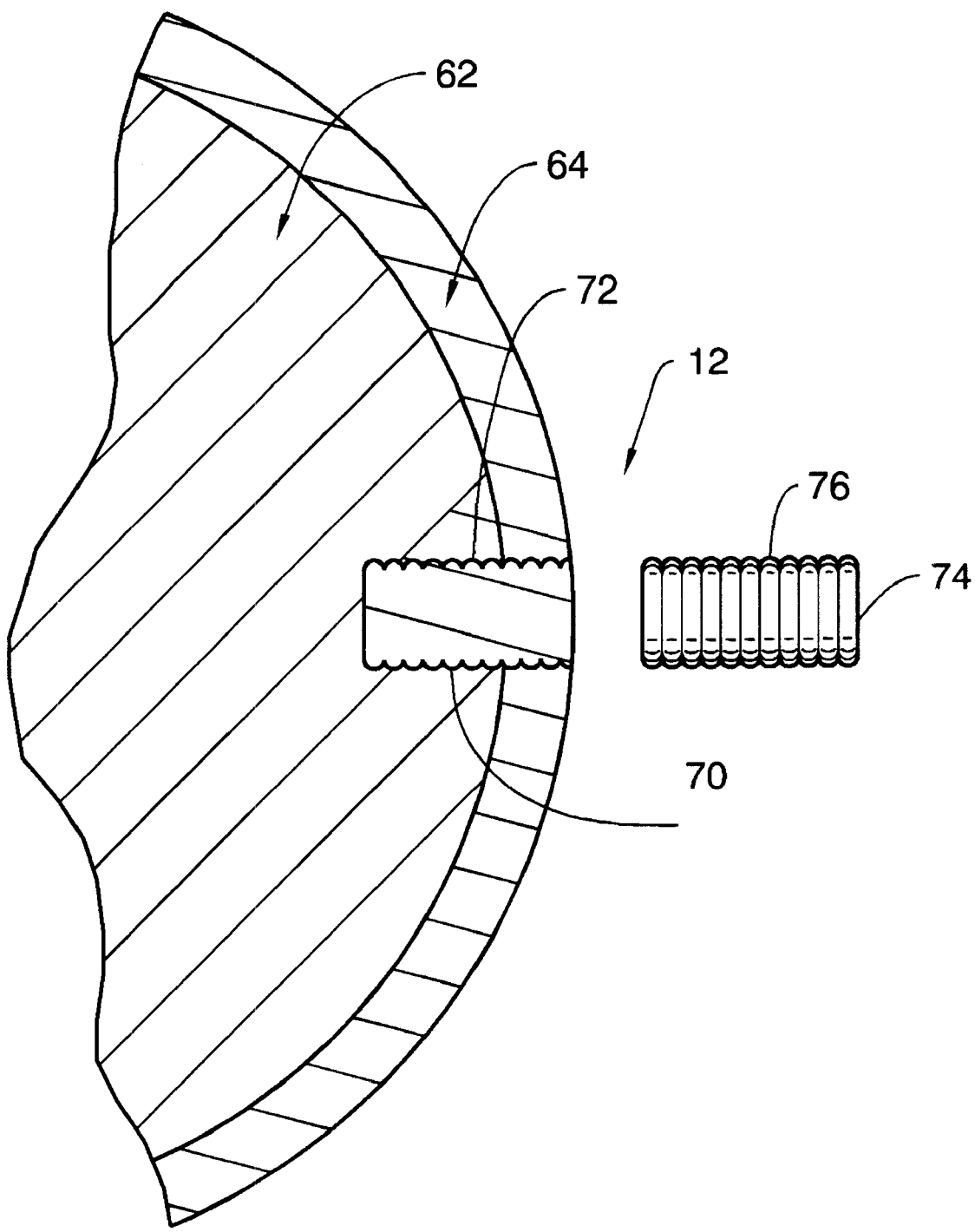
FIG. 4 is a partial cross sectional side view of the visual seam indicator.

Referring to FIGS. 2 and 3, a portion of a membrane roof assembly is illustrated and generally designated by the reference numeral 14. The membrane roof assembly 14 typically includes a horizontal substrate or underlayment 16 which may be metal panels, concrete, gypsum board, wood boards or wood panels such as plywood, particle board and the like or other material capable of supporting and dispersing to supporting ceiling joists, girders or beams (not illustrated) the loads typically encountered by and on flat roofs. The horizontal underlayment 16 typically, though not necessarily, receives a layer of insulation which may be polystyrene foams, polyisocyanurate, wood fiber, gypsum or a combination of these types of materials having appropriate structural and insulating characteristics suitable for roofing applications.

A first or lower layer of roofing membrane 14A is rolled into place and rests upon the upper horizontal surface of the insulation or the underlayment 16, if insulation is not utilized. Positioned in overlapping relation along the longitudinal edge of the first membrane 14A is the second membrane 14B.

The roofing membranes may be selected from a wide variety of thermoplastic and composite thermosetting materials that may be heat welded. The sheets may be of most any suitable material so long as the material is not a fully cured elastomeric thermoset material. For example, appropriate thermoplastic materials are polyvinyl chloride (PVC), various alloys of polyvinyl chloride such as copolymer alloy membranes (CPA), ethylene interpolymers (EIP), and nitrile alloy membranes (NBP), thermoplastic olefins (TPO), polyethylene and polypropylene, chlorinated polyethylene (CPE), and polyisobutylene (PIB). Copolymer alloy membranes are mixtures/alloys of high molecular weight polymeric plasticizers, stabilizers, biocides, and antioxidants, and pigments with PVC. Ethylene interpolymers are thermoplastic compounds consisting of ethylene interpolymers, PVC, stabilizers, antioxidants, pigments, and other modifying polymers as well known in the art. Nitrile alloy membranes are compounds from butadiene-acrylonitrile copolymers mixed with PVC. Suitable thermosetting materials are chlorosulphonated polyethylene (CSPE) and the like. The sheets may be of any suitable length and width as desired subject to manufacturing and performance considerations.

The overlapping membranes 14A and 14B are seamed by a roof membrane welding apparatus 10 to form a single-ply membrane roof It will be appreciated that a variety of welding apparatus are capable of being utilized in accordance with the present invention and are commercially available with different frame materials, number of wheels and wheel patterns.

In a preferred embodiment, the roof membrane welding apparatus 10 as shown in FIG. 1 and generally includes a hot air welder 20 and a chassis 22 movably supported by wheels 30. The chassis 22 may be movably supported by a set of two spaced rear wheels 30 and a set of two spaced forward wheels 30. The rear wheels and forward wheels 30 are mounted to the underside of the chassis 22 adjacent each corner of the chassis. Although the chassis is shown with four wheels, it will be appreciated that most any number and arrangement of wheels may be used to movably support the chassis.

The chassis 22 is preferably a one piece frame made of a light weight material such as cast aluminum. Extending generally upward from the chassis 22 is a guide handle 34 at the end of which is a grip 36. In a preferred embodiment, the guide handle 34 is a metal rod and is mounted to a threaded boss on the chassis 22. The chassis 22 is motor driven by a heavy duty electrical motor 38 of a type well known in the art. The motor 38 drives at least one drive wheel for movably transporting the chassis 22. The at least one drive wheel may be the same as one or more of the wheels 30 or may be a separate wheel. The motor 38 is operatively coupled to at least one of the wheels 64 through a gear transmission that is selectively engaged or disengaged with a drive axle by a transmission lever. The motor 38, thus, operates to drive at least one of the wheels 64 and to move the roof membrane welding apparatus 10 in the backward direction. As the roof membrane welding apparatus 10 moves backward, it is guided by manipulation of the guide handle 34.

Attached to the chassis 22 is the hot air welder 20. The hot air welder 20 includes a heating element for heating air and a blower for blowing the heated air to a nozzle 40 for selective distribution. A preferred heating element comprises a coil enclosed within a ceramic material, and has a wattage of about 3,000 to about 5,000 watts. Typically, the hot air welder 20 is attached to the chassis 22 by means of a welder cradle of a type well known in the art which is bolted to the chassis.

The present invention is not necessarily limited to a hot air welder. Most any suitable means may be used to introduce thermal energy to the seam area of the overlapping membranes to soften the overlapping area of membranes. For example, the welder may include a source of laser light or a source to generate sound waves to introduce thermal energy to the overlapping roofing membranes thereby heating the overlapping membranes.

A control panel 42 is mounted to the chassis 22 for adjusting the speed and temperature of the hot air welder 20. For example, the amount of heat emitted by the heating element may be controlled by a thermostat, rheostat, or a potentiometer and the like operatively connected to a control knob of the control panel 42.

The nozzle 40 is operatively attached to the blower. The nozzle 40 selectively transfers heat produced by the heating element and blown by the blower to the first and second membranes 14A and 14B thereby forming a weld. The nozzle 40 includes an outlet 44 having an opening 50 for simultaneously applying thermal energy to the seam to areas of the overlapping second membrane 14B and the first membrane 14A.

At least one weld wheel 62 is located rearward of the nozzle 40 relative to the direction of movement of the roof membrane welding apparatus 10. The at least one weld wheel 62 is located in front of the outlet 44 of the nozzle 40 to press the first membrane 14A and the second membrane 14B firmly against the roof deck 16 and against each other after the weld has been applied. As a further aid in keeping as much pressure on the roof membranes 14A and 14B as possible, one or more weights may be affixed to the chassis over the at least one weld wheel 64.

For a more detailed discussion of one example of a chassis, motor, control panel and hot air welder arrangement and operation, reference is made to U.S. Pat. Nos. 4,855,004 and 4,834,828, 6,187,122 incorporated herein by reference.

The at least one weld wheel 62 (FIG. 3) has a generally cylindrical surface 64 for pressing against the overlapping roofing membranes 14A and 14B and at least one marker 12. The marker 12 can take the form of a male marker (a marker protruding from the weld wheel to form an indicia in the top exposed membrane) or a female marker (a marker extending into the weld wheel such that the top membrane surface material flows into the voids or depressions in the weld wheel). For example, the marker 12 may include a staple, aluminum screw posts, metallic insert, and the like. The marker 12 includes on the outermost end thereof an indicia 68. The indicia 68 may be of most any form or design as desired. For example, the indicia 68 may be a flat cylindrical surface or the indicia may be a symbol such as a raised logo and the like. The marker 12 may be formed of metal or plastic and the like to produce a raised member capable of producing a repeating indicia on the membrane.

The marker 12 may be affixed by an adhesive, a mechanical fastener, attached by drilling and tapping or joined by any suitable means known to one skilled in the art to the weld wheel 62 construction. In an alternate embodiment, the marker 12 may be affixed to a removable band of rubber that surrounds the cylindrical surface of the weld wheel 62. The marker 12 may extend through a cut hole in the band and pushed in to or through the band of the weld wheel and/or affixed by mechanical means as previously described. The band on the weld wheel 62 may also be machined (reversed engraved or embossed to have raised areas capable of transferring a depression mark to the membrane in a repeating manner). The band on the weld wheel 62 can also consist of alternating bands of material having different durometers or the outer peripheral edge of the band may be formed of a different durometer material to mark the membrane with indicia running continuously along the top surface of the overlapping second membrane 14B in the direction of the welding equipment.

In a preferred embodiment, the at least one weld wheel 62 includes at least one adjustable marker 12. As shown in FIGS. 1–3, the at least one weld wheel 62 includes at least one adjustable marker 12 comprising at least one opening formed in the cylindrical surface 64 and including female threads 72 and a generally cylindrical member 74 having a top indicia surface 68 and matching male threads 76. The height of the marker 12 is adjusted by turning the marker to raise or lower the marker with respect to the cylindrical surface 64. In an alternate embodiment, one or markers may be affixed through the cylindrical surfaces or physically attached to the exterior of the weld wheel 62.

The welding process using the roof membrane welding apparatus 10 in accordance with the present invention is carried out by laying a first membrane 14A on top of the underlayment 16 or other roofing structure. A roof membrane fastener 18 is then fastened to the first membrane 14A and to the underlayment 16 as known in the art. It will be appreciated that although a stress plate is shown in FIG. 2, other fastener assemblies may be used; e.g., a batten bar. The roof membrane fastener 18 is fastened adjacent and parallel to an edge of the first membrane 14A along the entire length of the edge, but does not touch the edge of the first membrane. The second membrane 14B is then laid over the first membrane 14A so as to overlap portions of the first membrane on both sides of the roof membrane fastener 18. After the first and second membranes 14A and 14B have been laid in the above overlapping position, the nozzle 40 of the roof membrane welding apparatus 10 is inserted between the first and second membranes 14A and 14B and transverse the width of the seam area. The nozzle 40 is then moved along and between the first and second membranes 14A and 14B. The nozzle transmits or directs air heated by the heating element through the outlet 44, to heat the top membrane 14B to at least the vicant softening point and form a heat sealing weld which hold the overlapping portions of the first and second membranes 14A and 14B together. One may control the amount of heat being applied to the membranes by adjusting the heating element, the blower speed, the width of the opening 50 in the outlet 44 or by controlling the speed of the motor.

The marker 12 is generally centered above the region of the overlapping roof membranes 14A and 14B that are to be heat sealed. When the membranes 14A and 14B undergo a phase change during the heating, the indicia 68 on the marker 12 is transferred to the top membrane 14B when the membranes undergo a phase change during heating. It will be appreciated that if the membranes 14A and 14B are not sufficiently heated, the indicia 68 will not properly transfer to the top surface of the membrane.

Given a typical thickness of the roofing membranes 14A and 14B, a visual indicia 68 on the membrane has been found to be a highly reliable indication that the adjacent surfaces of the roofing membranes 14A and 14B have been elevated to a temperature sufficiently high to predictably and repeatedly achieve a seal of high integrity.

When the top exposed membranes 14B shows the indicia 68 from the marker of the weld wheel 62, a weld has been achieved between the mating surfaces of these two layers of membranes.

Two membranes 14A and 14B may be welded together when the operator sets the welding apparatus 10 to deliver sufficient heat (Btu) and applies a load for time necessary for the heated material to cool below the glass transition temperatures for the membrane types. Hot air welding apparatus 10 forces heated air between and into the nip of two layers of membranes 14A and 14B. This heat raises the temperature of the membrane, which cause a phase change (material changes from a solid to a soft semi elastic molten material known as the vicant soften point). This phase change travels or moves from the point of heat's application through the membrane layer to the opposite side of the membrane. The load or force per area in the form of the weld wheel 62 pushes the molten interface together. The marker 12 on the weld wheel 62 leaves its indicia 68 on the top layer of the membrane 14B experiencing a glass transition phase change. By the action or movement of the weld wheel 62, which is taking heat from the top membrane 14B and absence of hot air at the mating area of the membrane layers 14A and 14B cool or go through a phase change back to-a solid material thereby leaving an outline of the marker 12, i.e., indicia 68, remaining on the top surface.

By selecting a temperature, pressure and speed on the welding apparatus 10 that allows the top exposed membrane 14B and bottom membrane 14A to experience a phase change, the membrane 14B will be marked in a repeating manner as proof that sufficient elements (time, temperature and pressure) have been achieved and that as long as the indicia 68 is present a positive destructive seam analysis test will be found at the interface of the layers of overlapping membranes.

If there are any changes in the site conditions that alter the appearance of the indicia 68, (raised (female) or indented (male) patterns on the surface) the operator must recalibrate the elements (time, temperature and pressure) of the welding apparatus 10. Time is the speed at which heat and a load is exerted on mating layers of membrane 14A and 14B by the movement of the welding apparatus 10 over the proposed seaming region. Pressure is a load (pounds) or force per area that is applied as a weld wheel 62 rolls over mating layers of membranes 14A and 14B. Temperature is the amount of Btu/area that introduced between the layers of membrane 14A and 14B to be joined.

The documents, patents and patent applications referred to herein are hereby incorporated by reference.

While the invention has been specifically described in connection with certain specific embodiments thereof, it is to be understood that this is by way of illustration and not of limitation, and the scope of the appended claims should be construed as broadly as the prior art will permit.

What is claimed is:

1. A roof membrane welding apparatus capable of applying a weld to a first membrane and an overlapping second membrane, the apparatus comprising:
    a movably supported chassis;
    a welder attached to the chassis for heating the top membrane to at least the vicant softening point to weld the overlapping second membrane and the first membrane; and
    at least one weld wheel rotatably attached to the chassis and located rearward of the nozzle relative to the direction of movement of the apparatus, at least one of the weld wheels including at least one marker having an indicia thereon that is transferred to a top surface of the second membrane only where the first membrane and the second membrane have undergone a phase change during heating.

2. The roof membrane welding apparatus of claim 1 wherein the at least one weld wheel has a generally cylindrical surface and the marker is raised and projects from the cylindrical surface.

3. The roof membrane welding apparatus of claim 2 wherein the marker includes on the outermost end thereof an indicia.

4. The roof membrane welding apparatus of claim 3 wherein the indicia is a flat cylindrical surface.

5. The roof membrane welding apparatus of claim 3 wherein the indicia is a raised symbol.

6. The roof membrane welding apparatus of claim 1 wherein the at least one weld wheel includes at least one adjustable marker.

7. The roof membrane welding apparatus of claim 6 wherein the at least one weld wheel includes at least one adjustable marker comprising at least one opening formed in the cylindrical surface and including female threads and a generally cylindrical member having a top indicia surface and matching male threads, wherein the marker is adjusted by turning the marker to raise or lower the marker with respect to the cylindrical surface.

8. The roof membrane welding apparatus of claim 7 wherein the marker includes on the outermost end thereof an indicia.

9. The roof membrane welding apparatus of claim 8 wherein the indicia is a flat cylindrical surface.

10. The roof membrane welding apparatus of claim 3 wherein the indicia is a raised symbol.

11. A weld wheel of a roof membrane welding apparatus capable of heating a first membrane and an overlapping second membrane to apply a weld to the first and second membrane, the weld wheel comprising:
    at least one marker having an indicia thereon that is transferred to a top surface of the second membrane only where the first membrane and the second membrane have undergone a phase change during heating.

12. The weld wheel of claim 11 wherein the marker includes on the outermost end thereof an indicia.

13. The weld wheel of claim 11 wherein the indicia is a flat cylindrical surface.

14. The weld wheel of claim 11 wherein the indicia is a raised symbol.

15. The weld wheel of claim 11 wherein the at least one marker is adjustable and comprises at least one opening formed in the cylindrical surface and includes female threads and a generally cylindrical member having a top indicia surface and matching male threads, wherein the marker is adjusted by turning the marker to raise or lower the marker with respect to the cylindrical surface.

16. A method of visually verifying the integrity of a weld formed between a first membrane and overlapping second membrane, the method comprising the steps of:
    heating the area of overlap between the first and second membrane to raise the temperature of the top membrane to at least the vicat softening point;
    pressing a marker including an indicia on the second membrane along the area of overlap such that the indicia is transferred to a top surface of the top membrane only where the top membrane and the bottom membrane both undergo a phase change.

17. The method of claim 16 wherein the at least one marker is adjustable and comprises at least one opening formed in the cylindrical surface and includes female threads and a generally cylindrical member having a top indicia surface and matching male threads, wherein the marker is adjusted by turning the marker to raise or lower the marker with respect to the cylindrical surface.

18. The method of claim 16 wherein the indicia is a flat cylindrical surface.

19. The method of claim 16 wherein the indicia is a raised symbol.

* * * * *